(12) United States Patent
Citro et al.

(10) Patent No.: US 11,946,461 B2
(45) Date of Patent: Apr. 2, 2024

(54) ASYMMETRIC BISTABLE SHAPE MEMORY ALLOY INERTIAL ACTUATOR

(71) Applicant: SAES GETTERS S.P.A., Lainate (IT)

(72) Inventors: Marco Citro, Varese (IT); Salvatore Coco, Cesano Maderno (IT); Stefano Alacqua, Como (IT)

(73) Assignee: SAES Getters S.p.A., Lainate (IT)

( * ) Notice: Subject to any disclaimer, the term of this patent is extended or adjusted under 35 U.S.C. 154(b) by 0 days.

(21) Appl. No.: 18/277,622

(22) PCT Filed: Feb. 24, 2022

(86) PCT No.: PCT/EP2022/054601
§ 371 (c)(1),
(2) Date: Aug. 17, 2023

(87) PCT Pub. No.: WO2022/184533
PCT Pub. Date: Sep. 9, 2022

(65) Prior Publication Data
US 2024/0035456 A1  Feb. 1, 2024

(30) Foreign Application Priority Data

Mar. 2, 2021 (IT) .................. 102021000004859

(51) Int. Cl.
*F03G 7/06* (2006.01)
(52) U.S. Cl.
CPC ......... *F03G 7/063* (2021.08); *F03G 7/06143* (2021.08); *F03G 7/064* (2021.08); *F05B 2260/502* (2013.01)

(58) Field of Classification Search
CPC ...... F03G 7/063; F03G 7/06143; F03G 7/064; F05B 2260/502
See application file for complete search history.

(56) References Cited

U.S. PATENT DOCUMENTS

2009/0224584 A1  9/2009 Lawall et al.
2016/0201816 A1  7/2016 Rastegar

FOREIGN PATENT DOCUMENTS

EP  2926066 A1  10/2015
GB  2558618 A  7/2018

OTHER PUBLICATIONS

Amended claims filed after receipt of European Search Report, Societa Italian Brevetti, dated Jul. 25, 2022, 3 pages.
Amendments received before examination, Societa Italiana Brevetti, dated Jul. 25, 2022, 1 page.
Decision to grant dated Mar. 23, 2023 in European Patent Application No. 22707721.1, 2 pages.
International Search Report and Written Opinion dated Apr. 7, 2022 in PCT/EP2022/054601, 13 pages.
Italian Search Report and Written Opinion dated Nov. 8, 2021 in Patent Application No. IT 202100004859, 7 pages.

*Primary Examiner* — Vicky A Johnson
(74) *Attorney, Agent, or Firm* — Element IP, PLC (57) ABSTRACT

An asymmetric bistable shape memory alloy inertial actuator capable of preventing accidental actuation caused by environmental temperature variations but preserving temperature-related safety features and its use in devices.

14 Claims, 7 Drawing Sheets

ASYMMETRIC BISTABLE SHAPE MEMORY ALLOY INERTIAL ACTUATOR

The present invention relates to an asymmetric bistable inertial actuator, its method of operation and its use in devices, and in particular to an actuator in which the driven element is moved by one or more wires made from a shape memory alloy (indicated in the following as "SMA").

It is known that the shape memory phenomenon consists in the fact that a mechanical piece made of an alloy that exhibits said phenomenon is capable of transitioning, upon a temperature change, between two shapes that are preset at the time of manufacturing, in a very short time and without intermediate equilibrium positions. A first mode in which the phenomenon may occur is called "one-way" in that the mechanical piece can change shape in a single direction upon the temperature change, e.g. passing from shape A to shape B, whereas the reverse transition from shape B to shape A requires the application of a mechanical force.

On the contrary, in the so-called "two-way" mode both transitions can be caused by temperature changes; this occurs thanks to the transformation of the micro-crystalline structure of the piece that passes from a type called martensitic, stable at lower temperatures, to a type called austenitic, stable at higher temperatures, and vice versa (M/A and A/M transition). These transitions are characterized by four temperatures: Martensite final (Mf,), Martensite start (Ms), Austenite start (As), Austenite final (Af).

A SMA wire has to be trained so that it can exhibit its features of shape memory element, and the training process of a SMA wire usually allows to induce in a highly repeatable manner a martensite/austenite (M/A) phase transition when the wire is heated and to induce an austenite/martensite (A/M) phase transition when the wire is cooled. In the M/A transition the wire undergoes a shortening by 3-5% which is recovered when the wire cools down and through the A/M transition returns to its original length.

This characteristic of SMA wires to contract upon heating and then to re-extend upon cooling has been exploited since a long time to obtain actuators that are very simple, compact, reliable and inexpensive. In particular, this type of actuator is used in some bistable electric switches to perform the movement of a drive element from a first stable position to a second stable position and vice versa. It should be noted that the term "drive element" is intended here to have a very generic meaning since it can take countless shapes according to specific manufacturing needs, as long as it is the element whose movement determines the commutation of the switch between two stable operating positions.

Some examples of bistable SMA wire actuators are described in U.S. Pat. Nos. 4,544,988, 5,977,858, 6,943,653 and EP 2735013, in the applicant's name, all describing solutions with two SMA wires.

Another example of a bistable SMA actuator is described in U.S. Pat. No. 4,965,545, where the bistable behavior is achieved through the use of SMA wires in antagonistic configuration, EP 1593844 using a SMA wire acting on a rotating element with a spring as stability locker, or GB 2558618 showing two SMA wires in antagonistic configuration to switch the inclination of a rocker having a fixed pivoting element placed in its mid portion.

A SMA-based solution exploiting a different principle is described in U.S. Pat. No. 8,656,713 disclosing an inertial actuator where an inertial mass is separated from the actuator body and driven over a longer distance by impulse activation. This implies a high degree of customization for properly designing the return mechanism and an unavoidable delay when the system needs to be switched back in the starting position, as well as a lack of "symmetry" between the two stable configurations that may prevent its successful usage in certain applications, for example flow diverters as described later on.

Another SMA-based solution for a bistable inertial actuator is described in WO 2021/197980 in the applicant's name, describing a symmetric type of actuator in which the forces applied by the SMA wires to an inertial element to switch the actuator between two stable statuses are essentially equal. The actuator according to the present invention shares with the one described in said application the advantage of greatly reducing the need of the so called "overrun" usually present in all bistable-based solutions.

There are some particular applications in which it is an advantageous feature to have only one transition driven by inertial behavior while the return transition to the starting position is differently driven. For example, an actuator exploiting the Joule effect for moving the actuator from a first position to a second position, and then using as suitable mechanism for the switch-back to the first position a SMA actuation either via current control or through an increase in the environment temperature (T>Af). An exemplary advantageous application of this concept is an electrical relay in which there is an automatic disengagement of the actuator if the temperature is too high and representative of a dangerous situation (fire).

The purpose of the present invention is to overcome the drawbacks of prior art actuators, with particular reference to the capability to prevent accidental actuation linked to environment temperature variations but preserving temperature-related safety features, and in a first aspect thereof consist in an asymmetric inertial bistable shape memory alloy actuator comprising the elements recited in claim 1.

Preferably, the asymmetric inertial bistable shape memory alloy actuator is configured such that the d2/d1 ratio is comprised between 0.05 and 0.70, preferably between 0.10 and 0.30, with d1 defined as the distance between the crank pin and the dead center of the crank-and-rod mechanism in the first stable position, and d2 defined as the analogous distance in the second stable position.

The different distance in the two actuator stable positions is the key concept of the present invention and ensures the asymmetric behavior of the actuator. In particular, in one transition (from the first stable position to the second stable position) it is important to have a sufficient distance from the dead center in order for a mass M present on the crank-and-rod mechanism to gain enough momentum to pass the dead center, while in the return run (from the second stable position to the first stable position) the transition is driven by an additional force not provided solely by the SMA wire actuation. Such force may be given by:
 the weight force of mass M or,
 a magnetic force when mass M and/or the crank-and-rod mechanism is made with a magnetic or ferromagnetic material and the actuator comprises at least one suitable stationary magnet.

As per the above definition, the transition from the first stable position to the second stable position can happen only upon fast actuation of the shape memory alloy wire and is essentially solely inertia-driven, whereas the return or switch-back from the second stable position to the first stable position requires at least a second force contribution to the SMA wire action, such additional force being provided by weight or at least one magnet, or the sum of weight and magnetic action.

The invention will be further illustrated through the following exemplary embodiments with the help of the annexed figures wherein.

In order to make the figures easier to understand, dimensions and dimensional ratios of the elements have in some cases been altered, with particular and nonexclusive reference to the size of the inertial mass and the shortening of the SMA wire. Moreover, some elements neither necessary for the understating of the invention nor for its characterization, such as the current source for the SMA wires, have not been represented.

Figure 1A:
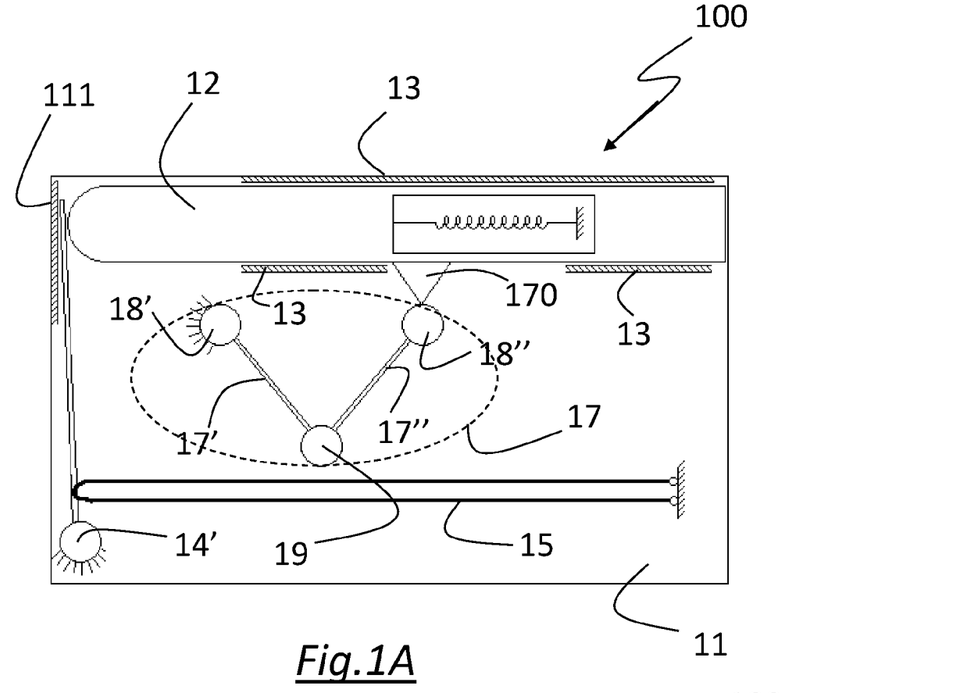
FIGS. 1A and 1B are schematic representations of an asymmetric inertial bistable shape memory alloy actuator according to a first preferred embodiment of the present invention in its two stable positions.
Figure 1B:
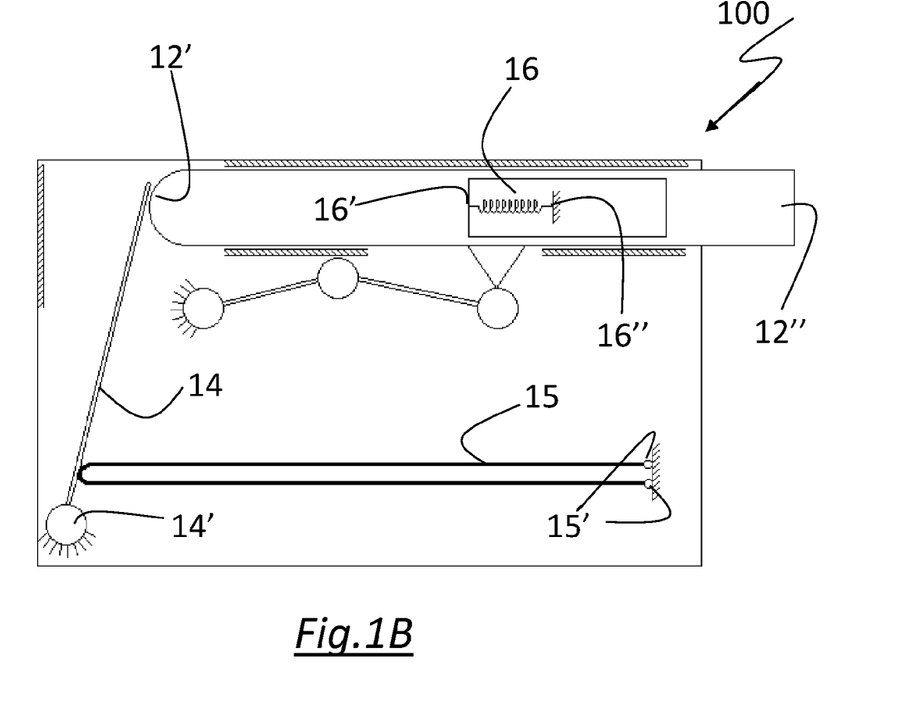

A schematic representation of a first embodiment of an asymmetric bistable shape memory alloy actuator 100 according to the present invention is shown in FIG. 1A (first stable position) and 1B (second stable position). Actuator 100 comprises a stationary support 11, a movable slider 12 having a first end 12' and a second end 12", a slider guide 13 fixed to the stationary support 11, and a rotatable lever 14 with one unrestrained extremity contacting the stationary support 11 through an end-stop 111 and the other one fixed to the stationary support 11 via a pivot 14'. The unrestrained extremity of the rotatable lever 14 also contacts the first end 12' of the movable slider 12 and moves it in a first direction (to the right in the illustrated example) upon actuation of a shape memory alloy wire 15 having a U-shape configuration, with its extremities fixed onto the stationary support 11 via terminals 15' and its central portion connected to the rotatable lever 14.

Slider 12 is biased towards the first stable position by means of a spring 16 having a first end 16' connected to slider 12 and a second end 16" connected to the stationary support 11, said biasing spring 16 being lodged in a suitable cavity in slider 12. Other alternative means could be used to perform said biasing action, such as magnetic means or gravitational means (e.g. a mass connected to the first end 12' by a cable passing over a pulley).

Actuator 100 comprises a crank-and-rod mechanism 17 for controlling the movement of an inertial element 19 of mass M arranged at the crank pin, i.e. at the vertically movable pivoting connection between the crank and the rod. More specifically, a first movable arm 17' of the crank-and-rod mechanism 17 acts as crank and is connected between element 19 and a first pivot 18' fixed to support 11, and a second movable arm 17" of the crank-and-rod mechanism 17 acts as connecting rod and is connected between element 19 and a second pivot 18" fixed to slider 12 via a suitable coupler 170.

In this way, the crank-and-rod mechanism 17 and slider 12 form an inverted slider-crank linkage, in which the sliding movement of slider 12 along guide 13 in a first direction starting from the first stable position of FIG. 1A results in a counter-clockwise rotation of crank 17' around pivot 18'.

Figure 1C:
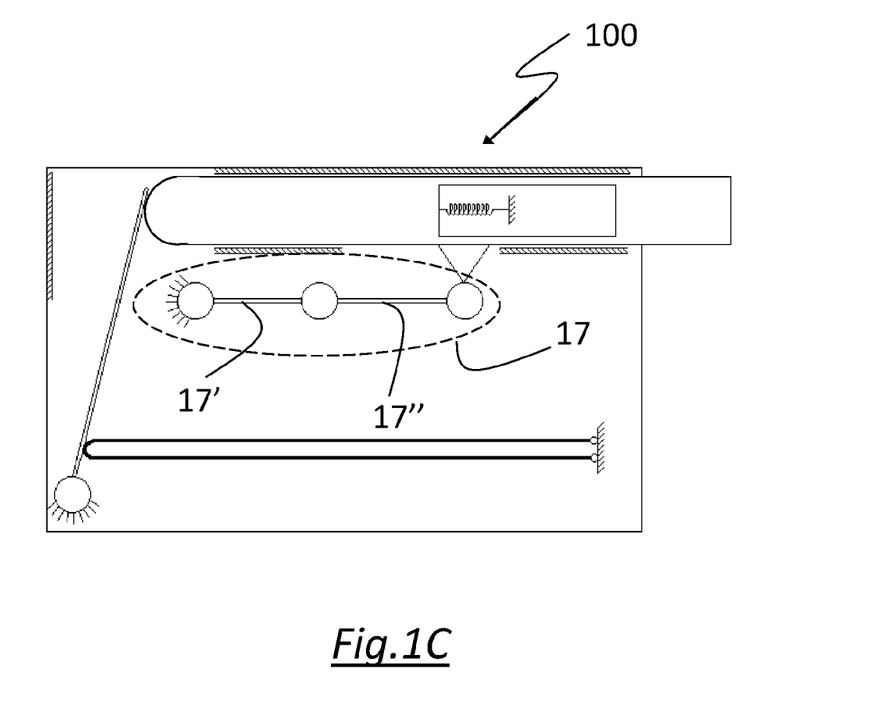
FIG. 1C is a schematic representation of the above actuator in an intermediate unstable position corresponding to the dead center.

The actuation of the shape memory alloy wire 15 is such that the crank-and-rod mechanism 17 is brought onto its dead center (FIG. 1C) with the first crank-and-rod movable arm 17' aligned with the second crank-and-rod movable arm 17". From there, actuator 100 is capable to move from the first stable position (FIG. 1A) to the second stable position (FIG. 1B) only if the SMA wire 15 is rapidly actuated and the inertial element 19 of mass M is accelerated to move from the first stable position to the second stable position.

The switch-back from the second stable position to the first stable position is once again achieved by actuation of the shape memory alloy wire 15 against the resistance of spring 16, to bring the crank-and-rod mechanism 17 to its dead center through a clockwise rotation of crank 17' around pivot 18'. In this case, it is the weight force acting on the inertial element 19 of mass M that brings the crank-and-rod mechanism 17 out of the dead center, and consequently slider 12 in the first stable position of FIG. 1A.

The above description explains the concept of asymmetry for the inertial actuator according to the present invention, i.e. the switching between the first and second stable positions is only related to the force exerted by the SMA actuation, that geometrically brings the crank-and-rod mechanism 17 to its dead center, the movement of element 19 from the dead center toward the second stable position being always and solely given by inertial force (fast actuation of the SMA wire 15).

On the other hand, switching back from the second stable position to the first stable position is due to the SMA wire actuation, that brings the crank-and-rod mechanism 17 to its dead center, while the movement of element 19 from the dead center toward the first stable position requires an additional force contribution, more specifically gravity in the embodiment of FIGS. 1A-1B. This implies that the crank-and-rod mechanism 17 is arranged in a substantially vertical plane and that the second stable position is higher than the first stable position and closer to the dead center.

Basically, the transition from the second stable position to the first stable position just requires the SMA wire actuation, no matter the mode (Joule or heating from the surrounding environment) or its actuation speed.

The present invention is not limited to a specific way to connect the SMA wire 15 to the rotatable lever 14. Some of the more common configurations are shown in the schematic views of FIGS. 2A-2D.

Figure 2A:
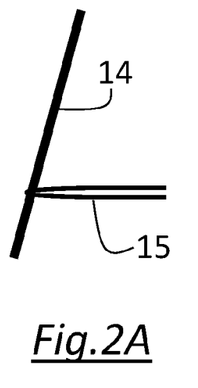
FIGS. 2A-2D are schematic representations of some preferred connection arrangements for the shape memory alloy wire present in the actuator.

More specifically, FIG. 2A shows the connection used in FIGS. 1A-1B, with a SMA wire 15 in a U configuration wound over the rotatable lever 14.

Figure 2B:
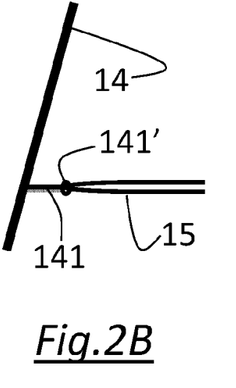

In FIG. 2B, a SMA wire 15 in U configuration is wound over an eyelet 141' connected to the rotatable lever 14 by means of a rod 141.

Figure 2C:
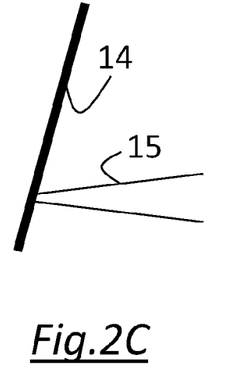

In FIG. 2C, a SMA wire 15 is fixed directly to the rotatable lever 14 in the so called "V-shape configuration".

Figure 2D:
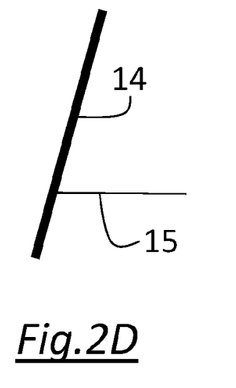

FIG. 2D shows the simplest alternative with a SMA wire 15 in a straight configuration.

With regards to SMA wires connection and numbers, it is to be underlined that even though in principle two or more SMA wires can concurrently act onto the rotatable lever 14 to accelerate the inertial mass 19, in reality such SMA wires concurrent actuation and control is neither practical nor easy to achieve.

Figure 3A:
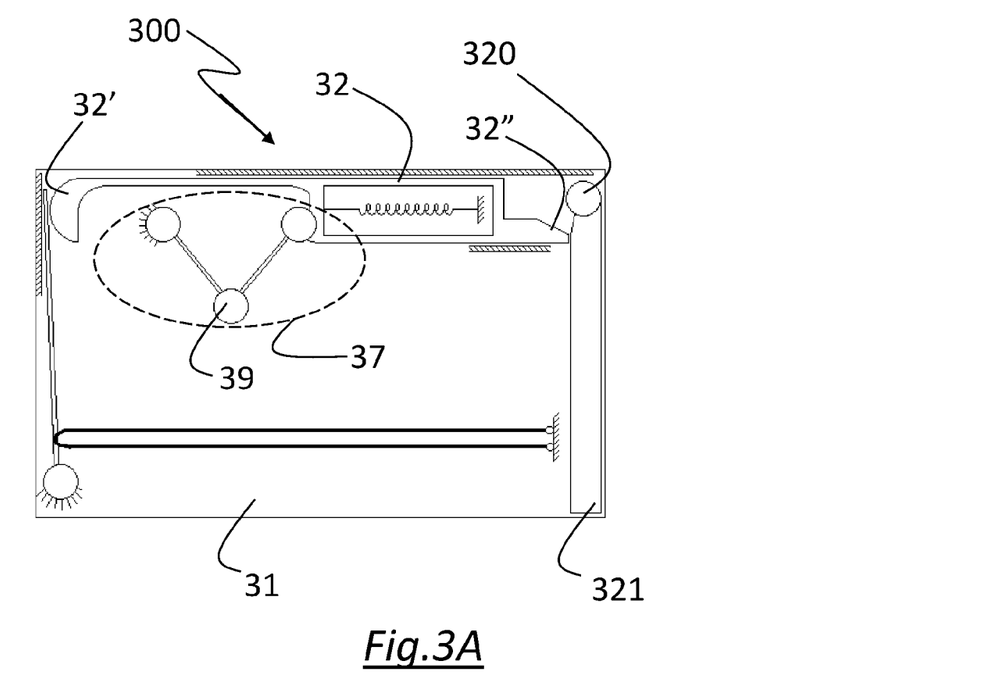
FIGS. 3A and 3B are schematic representations of an asymmetric inertial bistable shape memory alloy actuator according to a second embodiment of the present invention in its two stable positions.
Figure 3B:
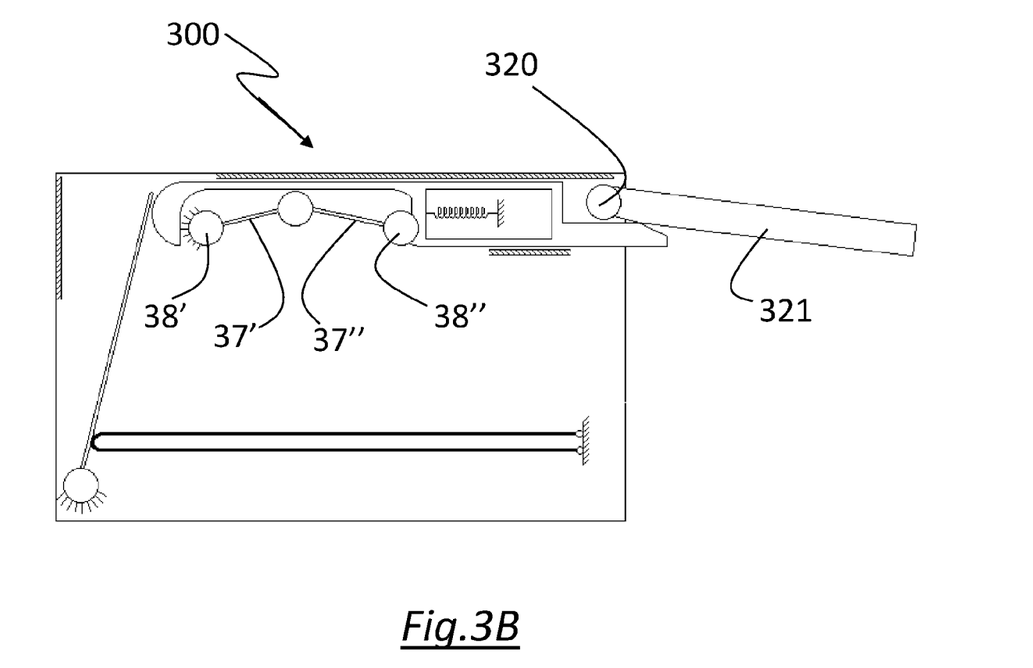

The asymmetric inertial bistable shape memory alloy actuator according to the present invention may be realized in other embodiments. For example, FIGS. 3A and 3B show a schematic representation of a second embodiment of an asymmetric inertial bistable shape memory alloy actuator 300 in its two stable positions. In this case, the second end 32" of slider 32 drives a lever 321 mounted on support 31 through a pivot 320 so as to extend the "reach" of the actuator amplifying its stroke. Another difference shown in FIGS. 3A and 3B is the fact that the first pivot 38' of the crank-and-rod mechanism 37 acts as an end-stop for the first end 32' of slider 32, and the second pivot 38" is directly connect to slider 32, such that both arms 37', 37" and the inertial element 39 are located within slider 32 in the second stable position of FIG. 3B.

Figure 4A:
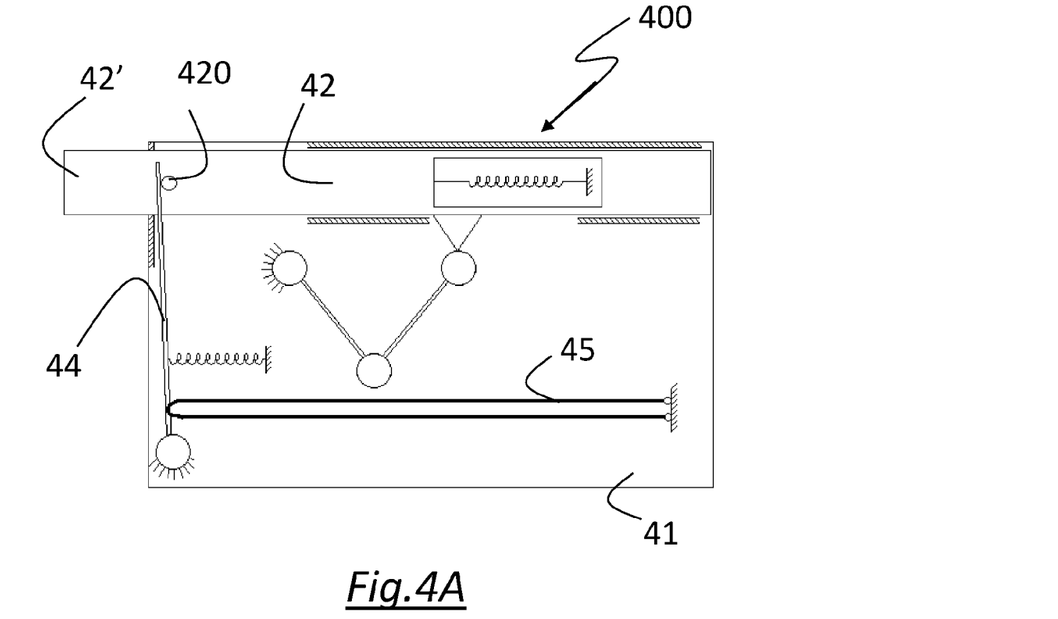
FIGS. 4A and 4B are schematic representations of an asymmetric inertial bistable shape memory alloy actuator according to a third embodiment of the present invention in its two stable positions.
Figure 4B:
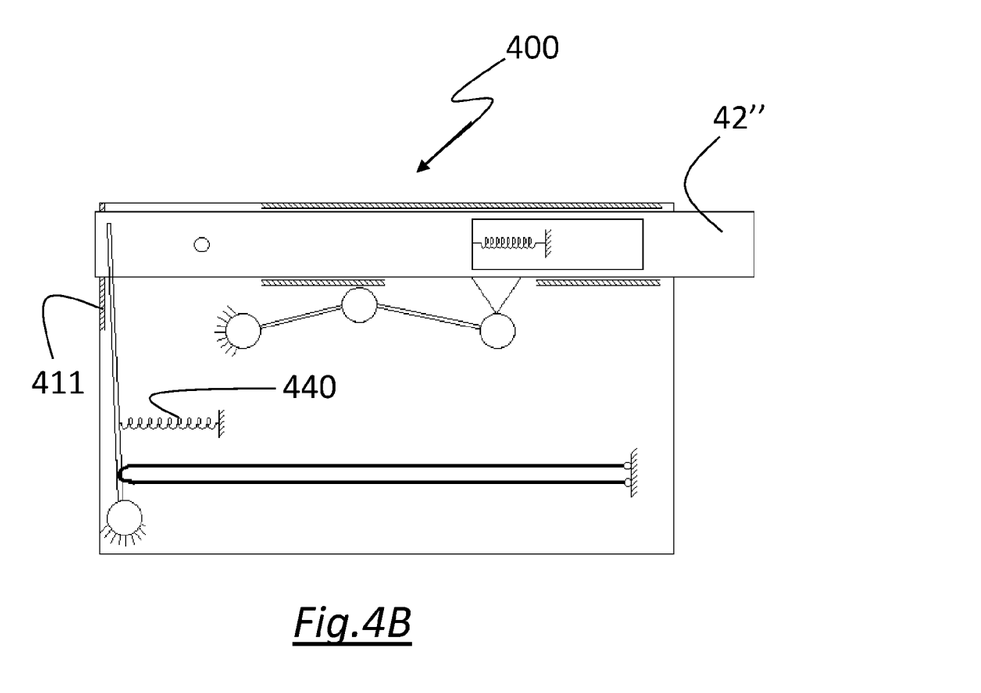

FIGS. 4A and 4B show a schematic representation of a third embodiment of the present invention in which an inertial bistable actuator 400 includes a slider 42 that is longer than the stationary support 41. More specifically, in the first stable position of FIG. 4A the first end 42' of slider 42 sticks out from the left of support 41, whereas in the second stable position of FIG. 4B the second end 42" sticks out from the right of support 41. In this case, the rotatable lever 44 acts on slider 42 by impinging on a suitable internal pin 420 of the latter rather than on the first end 42'.

The bistable asymmetric inertial actuator 400 also presents a return spring 440 acting on the rotatable lever 44 so as to bring it back to the starting position against an end-stop 411 once the SMA wire 45 is deactivated. In this way, the SMA wire 45 does not remain loose when the actuator is in the second stable position, as in the first two embodiments, in case that could cause problems with adjacent elements that might be touched by the loose wire.

Figure 5A:
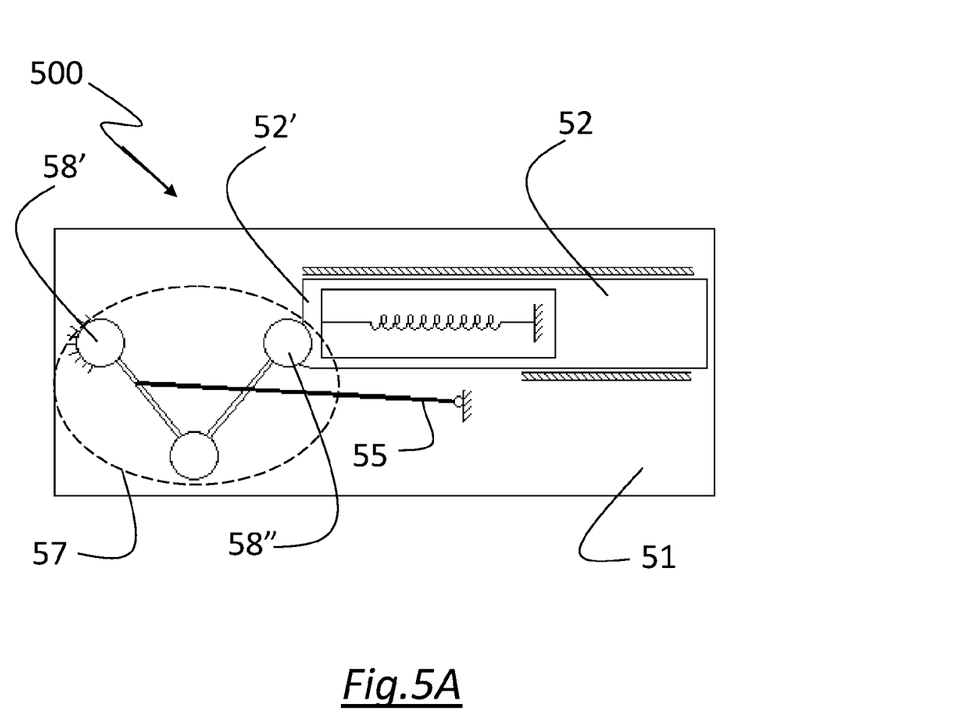
FIGS. 5A and 5B are schematic representations of an asymmetric inertial bistable shape memory alloy actuator according to a fourth embodiment of the present invention in its two stable positions.
Figure 5B:
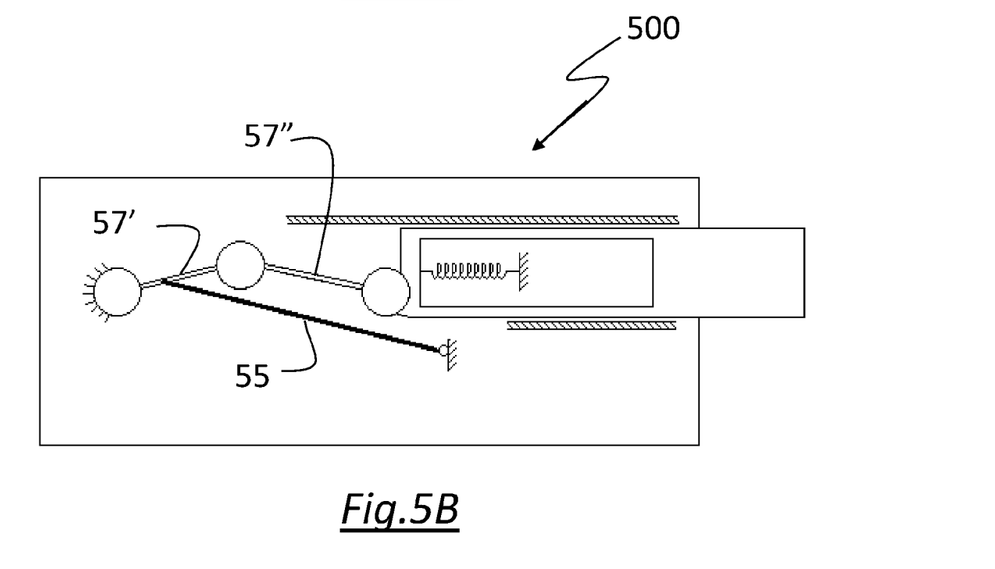

FIGS. 5A and 5B show a schematic representation of a fourth embodiment of the present invention in which an inertial bistable actuator 500 includes a slider 52 that is much shorter than the stationary support 51. More specifically, the crank-and-rod mechanism 57 is placed to the side of slider 52, i.e. the first pivot 58' is to the left of the first end 52' with the second pivot 58" directly connected thereto, and the shape memory alloy wire 55 is directly connected to crank 57' of the crank-and-rod mechanism 57 thus dispensing with the rotatable lever used in the previous embodiments.

Figure 6A:
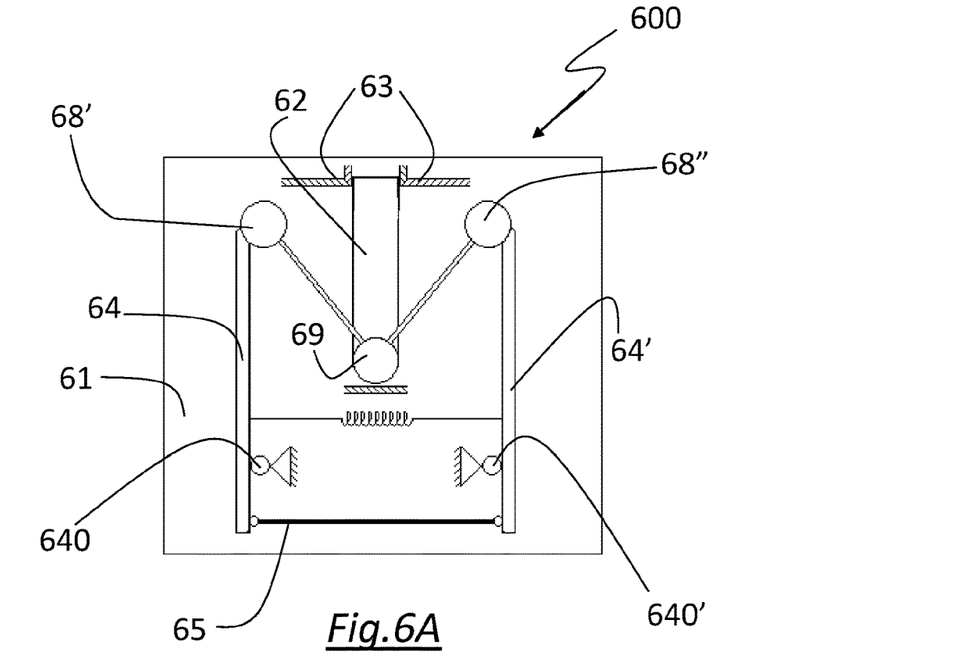
FIGS. 6A and 6B are schematic representations of an asymmetric inertial bistable shape memory alloy actuator according to a fifth embodiment of the present invention in its two stable positions.
Figure 6B:
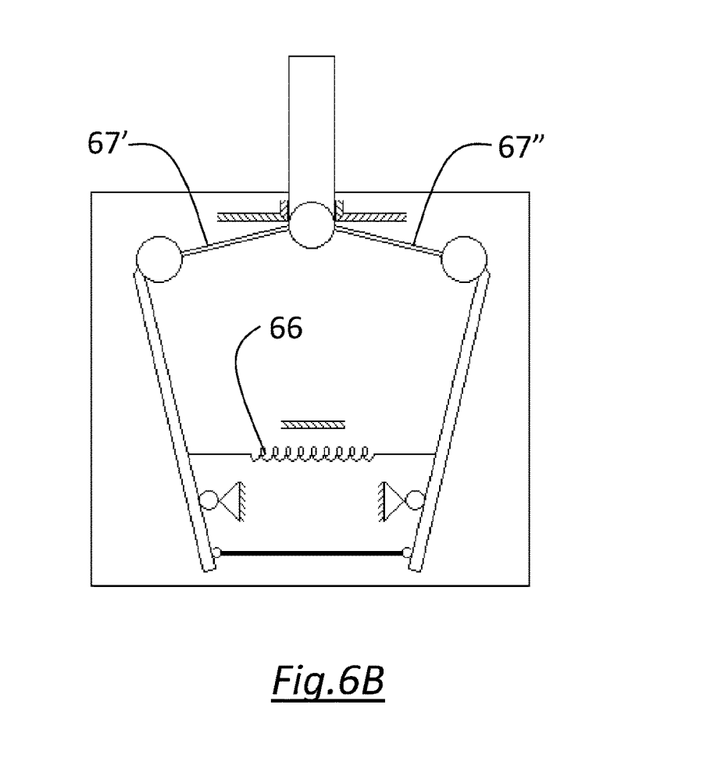

FIGS. 6A and 6B show a schematic representation of a fifth embodiment of the present invention in which an inertial bistable actuator 600 includes a slider 62 that is connected directly to the inertial element 69 joining the first and second arms 67', 67" of the crank-and-rod mechanism. Slider 62 extends along the direction of movement of the inertial element 69 to which it is connected at one end, while the opposite end is located between guide elements 63. Two levers 64, 64' are connected at their proximal ends respectively to the first and second pivots 68', 68" of the crank-and-rod mechanism, and are connected at their opposite distal portions respectively to stoppers 640 and 640' that are fixed on a stationary support 61.

The actuation and consequent shortening of a shape memory alloy wire 65 connected between levers 64, 64' at a position more distal with respect to said stoppers 640, 640' results in the opening out of the top ends of levers 64, 64' overcoming the resistance of a pulling spring 66 internally connecting the levers 64, 64' at a position between stoppers 640, 640' and slider 62. As a consequence, the crank 67' and the connecting rod 67" rotate upwards, with a counter-clockwise and clockwise rotation respectively, and the asymmetric inertial bistable shape memory alloy actuator 600 is moved from the first stable position of FIG. 6A to the second stable position of FIG. 6B.

It should be noted that in all the embodiments the actuation of the SMA wire is so fast and short, in the order of some milliseconds, that it just provides the initial impulse to accelerate the crank-and-rod mechanism enough to pass the dead center, therefore it does not oppose the movement of the actuator towards the second stable position. For example, in the fourth embodiment when the SMA wire 55 arrives to be aligned with crank 57' it is already no longer activated and does not oppose the counter-clockwise rotation of crank 57' towards the second stable position. The same applies in the other embodiments, i.e. when the crank-and-rod mechanism reaches the dead center, the SMA wire has already been deactivated.

Needless to say, the various embodiments illustrated above may be combined differently to obtain further embodiments not shown in the figures without departing from the scope and effect of present invention. For example, the pivoted lever 321 of the second embodiment could be used also in the first, third and fourth embodiments, or the leverless configuration of the fourth embodiment with the SMA wire directly connected to the crank could be used also in the first three embodiments.

Another immediate variant is given by the inertial mass M being simply connected to the crank-and-rod mechanism and not part or constituent of the crank pin, as depicted in all the embodiments. Moreover, the inertial mass M may be an equivalent mass from a series of masses present in the actuator, i.e. the sum of the contribution of two or more masses placed within the actuator preferably in symmetrical positions. In the most common variant, the inertial mass M is given by two masses disposed symmetrically with respect to the crank pin on the crank and rod and connected thereon.

In all of the embodiments above, the movement from the first stable position to the second stable position is caused by the fast actuation of the SMA wire, and the return from the second stable position to the first stable position is enabled by the weight force associated with the inertial mass M regardless of the actuation speed of the SMA wire. Needless to say, this imposes a constraint on the way the actuator is mounted since the direction of the weight force shall be directed from the second stable position to the first stable position and it will be essentially parallel to the plane in which the crank-and-rod mechanism, and thus the inertial mass M, moves between the first and second stable positions (taking the center of the inertial mass as reference point for the plane). In this context, the term "essentially parallel" indicates a situation in which the above elements are parallel or form an angle equal to or less than 45°, preferably less than 20°.

An asymmetric bistable shape memory alloy actuator according to a variant of the present invention is capable to allow for a higher degree of mounting freedom by using an inertial element and/or a crank-and-rod mechanism that is also magnetic or capable to respond to a magnetic field, i.e. being a magnetic element itself or capable of being attracted by a magnet.

Figure 7:
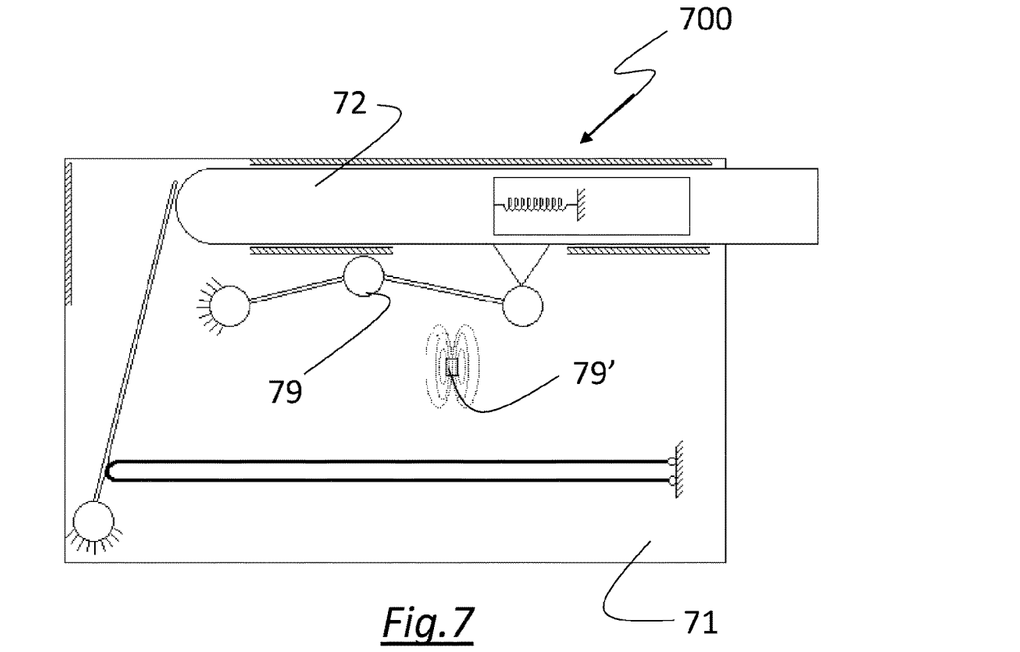
FIG. 7 is a schematic representation of an asymmetric inertial bistable shape memory alloy according to a sixth embodiment of the present invention, and, FIG. 8 is a schematic representation of an asymmetric inertial bistable shape memory alloy according to a seventh embodiment of the present invention.

FIG. 7 shows an inertial asymmetric bistable shape memory actuator 700 that is a replica of the actuator of FIG. 1B in its second stable position with the addition of a magnet 79' fixed onto the stationary support 71 to allow the non-inertial return from the second stable position to the first stable position of the inertial element 79, and consequently of slider 72, also when the actuator is mounted beyond the above-mentioned 45° limit. In this case, the inertial element 79 is made of or comprises a magnetic element of opposite polarity or a ferromagnetic material capable of being attracted by magnet 79'.

Figure 8:
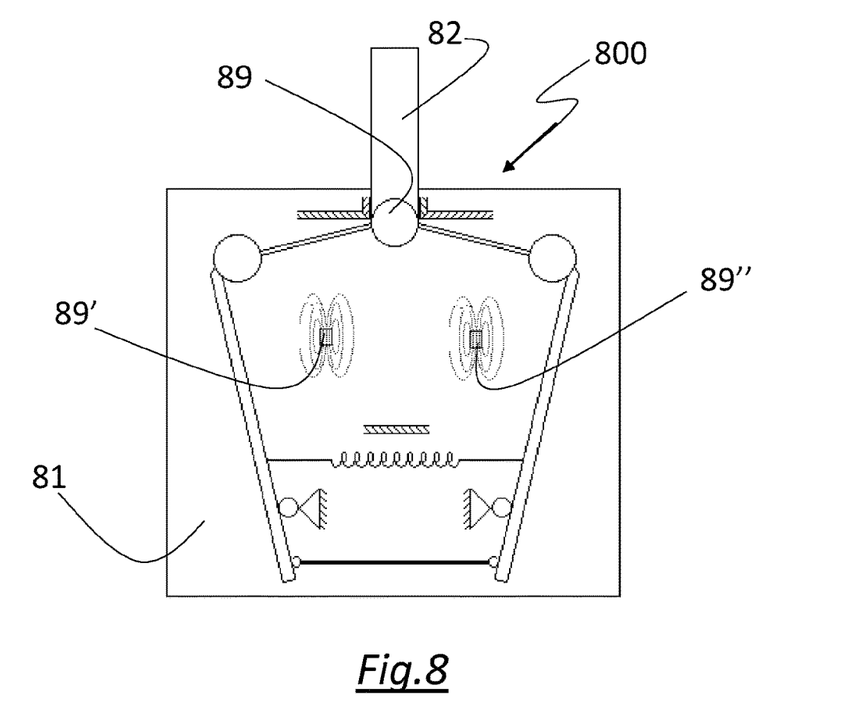

Similarly, FIG. 8 shows an inertial asymmetric bistable shape memory actuator 800 that is a replica of the actuator of FIG. 6B in its second stable position with the addition of a couple of magnets 89', 89" fixed onto the stationary support 81 and symmetrically positioned with respect to the inertial element 89 to allow the non-inertial return of the latter, and consequently of slider 82, from the second stable position to the first stable position. Also in this case, the inertial element 89 is made of or comprises a magnetic element of opposite polarity or a ferromagnetic element capable of being attracted by magnets 89' and 89".

Although FIGS. 7 and 8 show the addition of one or two magnets to the first and fifth embodiments respectively, it is clear that the same addition can be made also to the other embodiments and that the exact number and arrangement of the magnets can be adapted to the specific performance requirements of the actuator. In general, for the "magnetic" variant of the present invention, the magnet(s) is/are preferably placed between the first stable position of the crank pin and the dead center at a distance from the latter comprised between 1/10 and 9/10 of the distance d1 as previously defined, and they are arranged preferably in symmetrical positions with respect to the crank pin.

With the help of the magnet(s) the actuator can operate with any orientation, even when the crank-and-rod mechanism moves in a horizontal plane and the weight force does not contribute to the switch-back to the first stable position. It is clear that the arrangement and strength of the magnet(s), when permanent magnets are used, shall be designed to provide the pull on the crank-and-rod mechanism required to pass the dead center while minimizing the "braking" magnetic action that opposes the completion of the switch-back (the movement from the first to the second stable position is so fast and the inertial force is so high that the magnetic action does not result in a significant braking). Otherwise, with a little increase in cost and complexity of the actuator, it is also possible to use electromagnets that are activated and deactivated so as to provide the magnetic pull only when needed, similarly to the brief actuation of the SMA wire.

It is to be underlined that a person skilled in the art knows how to achieve fast actuation of shape memory alloy wires, typically in a time comprised between 5 and 25 ms, see for example the paper "The Mechanical Response of Shape Memory Alloys Under a Rapid Heating Pulse" by Vollach et al published in 2010 on Experimental Mechanics, or the paper "High-speed and high-efficiency shape memory alloy actuation" by Motzki et al. published in 2018 on Smart Materials and Structures.

With actuation time it is intended the time required to bring the shape memory alloy wire to a temperature where it is in its austenite phase, the so called Af temperature. In order to achieve such effect, some electronic circuitry may be associated with the SMA wire current supply such as a condenser, etc. even though in case of thin wires, such as wires with a diameter lower than 100 µm, even a battery can achieve such fast actuation times. Some exemplary fast actuation circuits for SMA wires are described in US2016/0186730 or in the still unpublished Italian patent application 102021000024875. The means for the fast actuation of the SMA wires can be mounted on the actuator itself or the actuator is connected through suitable cabling to such means.

It is to be underlined that the term "stationary" is to be interpreted in the context of an actuator that may be mounted onto movable systems or devices, whereby the stationary elements (such as support, magnet) are the ones that do not move/displace upon actuation of the shape memory alloy wire.

The invention is not limited to any specific shape memory alloy material, even though preferred are Ni—Ti-based alloys such as Nitinol that may exhibit alternately super-elastic behavior or shape memory alloy behavior according to its processing. The properties of Nitinol and methods allowing to achieve them are widely known to those skilled in the art, see e.g. the article "A Study of the Properties of a High Temperature Binary Nitinol Alloy Above and Below its Martensite to Austenite Transformation Temperature" by Dennis W. Norwich presented at the SMST 2010 conference.

Nitinol may be used as such or its characteristics in terms of transition temperature may be tailored by adding elements such as Hf, Nb, Pt, Cu. The proper choice of material alloy and its characteristics are commonly known to a person skilled in the art, see for example:

http://memry.com/nitinol-iq/nitinol-fundamentals/transformation-temperatures

Also the shape memory alloy wires may be used "per se" or with a coating/sheath to improve their thermal management, i.e. their cooling after being actuated. The coating sheath may be uniform, such as described in the U.S. Pat. No. 9,068,561 that teaches how to manage residual heat by resorting to an electrically insulating coating which is a heat conductor, while U.S. Pat. No. 6,835,083 describes a shape memory alloy wire having an enclosing sheath capable to improve cooling after every actuation cycle. Also a coating with a suitable dispersion of phase changing materials, such as described in WO 2019/003198 in the applicant's name, may be advantageously employed.

The use of an asymmetric inertial bistable shape memory alloy actuator according to present invention is not limited to a specific application, even though it is particularly advantageous in lids, shutters, latches, lockers, pin-pullers.

The invention claimed is:

1. An asymmetric inertial bistable shape memory alloy actuator comprising:
   a stationary support,
   a slider movably mounted on said stationary support,
   a crank-and-rod mechanism mounted on the stationary support and connected to said movable slider, said crank-and-rod mechanism having a, first stable position and a second stable position located on opposite sides with respect to its dead center,
   one or more inertial elements of total mass M coupled to or forming part of the crank-and-rod mechanism,
   only one shape memory alloy wire acting directly or indirectly on the crank-and-rod mechanism to switch the crank-and-rod mechanism from its first stable position to its second stable position and vice versa, biasing means to bias said slider towards the first stable position,
wherein a movable pivot connecting the crank and the rod of the crank-and-rod mechanism has a distance d1 from the dead center of the crank-and-rod mechanism in the first stable position that is greater than an analogous distance d2 in the second stable position.

2. An asymmetric inertial bistable shape memory alloy actuator according to claim 1, wherein a ratio between d2 and d1 is comprised between 0.05 and 0.70.

3. An asymmetric inertial bistable shape memory alloy actuator according to claim 2, wherein the ratio between d2 and d1 is comprised between 0.10 and 0.30.

4. An asymmetric inertial bistable shape memory alloy actuator according to claim 1, wherein the crank-and-rod mechanism includes a crank connected to the stationary support through a first pivot and a rod connected to the movable slider through a second pivot.

5. An asymmetric inertial bistable shape memory alloy actuator according to claim 1, wherein the biasing means consist of a spring having a first end connected to the movable slider and a second end connected to the stationary support.

6. An asymmetric inertial bistable shape memory alloy actuator according to claim 1, wherein the shape memory alloy wire acts indirectly on the crank-and-rod mechanism through a rotating lever having a first end connected to the stationary support through a pivot and a second end contacting the movable slider at a first end or at an internal pin, so as to switch the crank-and-rod mechanism between the two stable positions upon actuation of the shape memory alloy wire that is connected to said rotating lever.

7. An asymmetric inertial bistable shape memory alloy actuator according to claim 1, wherein the shape memory alloy wire is connected to the crank of the crank-and-rod mechanism.

8. An asymmetric inertial bistable shape memory alloy actuator according to claim 1, wherein the slider is connected to the movable pivot connecting the crank and the rod of the crank-and-rod mechanism and extends along the direction of movement of said movable pivot, the actuator further comprising two levers connected at a proximal end respectively to a first pivot and a second pivot of the crank-and-rod mechanism and connected at opposite distal portions respectively to stoppers that are fixed on the stationary support, the shape memory alloy wire being connected between said levers at a position more distal with respect to said stoppers such that its actuation results in an opening out of said proximal ends.

9. An asymmetric inertial bistable shape memory alloy actuator according to claim 8, wherein the biasing means consist of a pulling spring connected between the levers at a position between said stoppers and the slider, such that its action results in a closing in of the proximal ends.

10. An asymmetric inertial bistable shape memory alloy actuator according to claim 1, further comprising at least one magnet fixed to the stationary support at a position between the first stable position and the dead center of the crank-and-rod mechanism at a distance from the latter comprised between $1/10$ and $9/10$ of distance d1.

11. An asymmetric inertial bistable shape memory alloy actuator according to claim 1, wherein the orientation of a weight tierce is from the second stable position toward the first stable position and its direction forms an angle with a plane of movement of the crank-and-rod mechanism that is equal to or less than 45°.

12. An asymmetric inertial bistable shape memory alloy actuator according to claim 11, wherein the orientation of a weight force is from the second stable position toward the first stable position and its direction forms an angle with a plane of movement of the crank-and-rod mechanism that is less than 20°.

13. An asymmetric inertial bistable shape memory alloy actuator according to claim 1, wherein the one or more inertial element is part of the crank-and-rod mechanism.

14. An asymmetric inertial bistable shape memory alloy actuator according to claim 13, wherein the one or more inertial element is the movable pivot of the crank-and-rod mechanism.

* * * * *